United States Patent [19]

Krishnan et al.

[11] Patent Number: 5,098,478
[45] Date of Patent: Mar. 24, 1992

[54] WATER-BASED INK COMPOSITIONS

[75] Inventors: Ramasamy Krishnan, Sewaren, N.J.; Robert W. Bassemir, Jamaica, N.Y.; Timothy C. Vogel, Kenvil, N.J.

[73] Assignee: Sun Chemical Corporation, Fort Lee, N.J.

[21] Appl. No.: 624,790

[22] Filed: Dec. 7, 1990

[51] Int. Cl.$^5$ .......... C09D 11/00; C09D 5/00; C03C 17/00; C08K 5/06
[52] U.S. Cl. .......... 106/23; 106/20; 106/23; 524/377; 524/394; 523/160; 523/161
[58] Field of Search .......... 106/20, 23; 524/377, 524/394; 523/160, 161

[56] References Cited

U.S. PATENT DOCUMENTS

| | | | |
|---|---|---|---|
| 2,868,741 | 1/1959 | Chambers et al. | 524/377 |
| 4,137,205 | 1/1979 | Berenschot et al. | 524/377 |
| 4,184,881 | 1/1980 | Bradley | 106/20 |
| 4,854,969 | 8/1989 | Bassemir | 524/505 |
| 4,910,236 | 1/1990 | Foye et al. | 106/23 |
| 4,954,556 | 9/1990 | Bull et al. | 524/378 |
| 4,986,851 | 1/1991 | Dietz et al. | 106/23 |

Primary Examiner—Paul R. Michl
Assistant Examiner—Patrick Niland
Attorney, Agent, or Firm—Jack Matalon

[57] ABSTRACT

Water-based ink compositions comprising water, a pigment, a nonionic surfactant having a solubility in water of less than about 0.5 wt. % and a solubilizing agent sufficient to solubilize substantially all of the nonionic surfactant.

7 Claims, No Drawings

WATER-BASED INK COMPOSITIONS

This invention relates to water-based ink compositions. These ink compositions are especially useful for publication gravure; these inks may be used in place of conventional publication gravure printing inks which are typically based on hydrocarbon solvents. The ink compositions of the present invention contain water, a pigment, a particular type of nonionic surfactant and a solubilizing agent.

BACKGROUND OF THE INVENTION

Safety and environmental considerations are forcing changes in printing ink formulations. Solvent-based printing inks are now regarded as being undesirable from several points of view and are being tolerated only because effective water-based printing ink compositions have not been developed to the point where they can replace solvent-based inks in terms of ease of use, printability and economy. This is particularly true for publication gravure printing inks which are generally based on toluene or mixtures of toluene and aliphatic hydrocarbons. Such solvents are hazardous (explosions at publication gravure printing plants have occurred in recent years) and require expensive solvent recovery units to limit air effluents (toluene and toluene/aliphatic hydrocarbon mixtures are very volatile, particularly at the temperature and air flow conditions normally present in printing press driers).

As a result of heightened environmental and safety concerns, water-based inks are being introduced to replace solvent-based inks. However, prior art water-based inks have proven to be expensive and prone to printability problems, especially for publication gravure. Examples of such printability problems include poor transfer from the gravure cells and spreading behavior on paper. These printability problems typically manifest themselves as skipped dots in the tone areas and a generally "wormy" appearance and nonuniformity in the solids. U.S. Pat. No. 4,954,556 relates to water-based ink compositions comprising emulsion polymers and rewetting agents. This patent alleges that the ink compositions described therein can be printed at high speed without permanent drying in the cells of a gravure cylinder, transfer of the ink composition to the substrate is not adversely affected and the inks dry quickly without causing paper curling. Although such qualities are most desirable, the ink compositions described in this patent are nevertheless disadvantageous because they contain extremely high (i.e. 10-50 wt.%) amounts of surfactant(s). Such high surfactant content leads to trapping problems on the paper, foaming problems during printing and, most importantly, very high cost. Unless these latter problems can also be overcome, there would be very little incentive for a printer to change from a solvent-based ink to such a water-based ink.

DETAILS OF THE PRESENT INVENTION

It has now been discovered that it is possible to provide a water-based ink composition that overcomes the disadvantages of the ink composition of U.S. Pat. No. 4,494,556, while retaining its advantages. The ink compositions of the present invention thus may be readily substituted for traditional solvent-based inks, especially for publication gravure printing, thereby achieving the goals of safety and protection of the environment without any undue printing problems while maintaining an attractive cost.

The water-based ink compositions of the invention comprise:
(a) water;
(b) a pigment;
(c) a nonionic surfactant having a solubility in water of less than about 0.5 wt. % and being present in an amount effective to lower the dynamic surface tension of the ink composition to a level in the range of about 25 to 40 dynes/cm; and
(d) a solubilizing agent sufficient to solubilize substantially all of the nonionic surfactant.

Preferably, the dynamic surface tension of the ink composition will be in the range of 25 to 30 dynes/cm. This preferable range may be readily achieved by utilizing a nonionic surfactant (or mixtures of nonionic surfactants) having the lowest solubility in water and by adjusting the quantity. The nonionic surfactants preferably have a diffusivity in the range of $0.1-1 \times 10^{-9}$ $m^2$/second, preferably $0.3-0.6 \times 10^{-9}$ $m^2$/second and a solubility in water of less than 0.5 wt. % and are employed in amounts of about 1 to 4 wt. %, preferably 3 to 4.

Preferably the nonionic surfactant is selected from the group consisting of acetylenic diols containing 8 to 14 carbon atoms, acetylenic carbinols containing 8 to 14 carbon atoms and block copolymers of propylene oxide and ethylene oxide having a hydrophilic/lipophilic balance ("HLB") in the range of about 3 to 8 and a propylene oxide to ethylene oxide ratio of 8:1 to 3:1.

The ink composition of the invention also includes a solubilizing agent. The solubilizing agent is necessary in order to solubilize substantially all of the nonionic surfactant(s) present in the ink composition. It has been found that only those nonionic surfactants having a solubility (in water) of less than about 0.5 wt. % will produce the requisite lowering of the dynamic surface tension to a level of about 25 to 40 dynes/cm without using excessive amounts. Such level of dynamic surface tension assures that printability problems will not be encountered. The solubilizing agent is utilized in an amount that is sufficient to solubilize the nonionic surfactant(s) and therefore the amount of solubilizing agent will vary depending on the choice and amount of nonionic surfactant. In general, the solubilizing agent will be employed in an amount in the range of about 0.1 to 5 wt. %, preferably 2 to 4 wt. %.

Preferably the solubilizing agent is selected from the group consisting of the ammonium, potassium, or sodium salt of 8[5-Carboxy-4-Hexyl-Cyclohex-2-enyl]Octanoic Acid, the ammonium, potassium, or sodium salt of a $C_8$-$C_{13}$ dialkyl sulfosuccinic acid having a critical micellar concentration in the range of about 0.08 to 0.12, phosphate ester surfactants, such as the condensation products resulting from the reaction of polyphosphoric acid and a compound having the formula $R(CH_2CH_2O)_xH$, wherein x is an integer of 1 to 20 and R is either an alkylphenoxy group, the alkyl radical of which contains 5 to 10 carbon atoms, or is a $C_{10}$-$C_{18}$ alkoxy group, and mixtures thereof.

The ink composition of the invention will typically contain about 30 to 80 wt. %, preferably 50 to 70 wt. %, water and about 3 to 15 wt. %, preferably 5 to 10 wt. %, of a pigment. The pigment may be any of those typically found in solvent-based publication gravure inks such as carbon black, phthalocyanine blue, phthalocyanine green, diarylide yellows, lithol rubine, red lake C, barium lithol, and the like.

The ink composition of the invention may also contain the usual adjuvants, including solid binders such as acrylic and methacrylic resins, styrene-acrylic resins, rosin salts, etc.; waxes such as polyethylene waxes, polytetrafluoroethylene waxes, silicones, etc; and the usual corrosion inhibitors and biocides, if desired. In addition, it is usually beneficial to add 10 to 14 wt. %, preferably 15 to 30 wt. % of one or more emulsion polymers, i.e. aqueous addition polymers such as acrylic or vinyl emulsion polymers. Such polymers are well known in the prior art and are prepared from monomers such as acrylic or methacrylic acid esters of polyhydric alcohols acrylic acid or methacrylic acid esters, methyl methacrylate, styrene, vinyl styrene, vinyl toluene, vinyl acetate, vinyl chloride, vinylidene chloride and the like.

The water-based ink compositions of the invention are further illustrated by the following non-limiting examples in which all parts are by weight, unless otherwise indicated.

EXAMPLE 1

A water-based. flexographic new ink was formulated from the following components:

| Component | Wt. % |
| --- | --- |
| Carbon Black | 13 |
| Lignin | 5 |
| Acrylic Emulsion Resin | 8 |
| Dipropylene glycol | 3 |
| Urea | 3 |
| Phosphate Ester Surfactant | 0.5 |
| Clay | 2 |
| Anti Foam | 1 |
| Solubilizing Agent + Nonionic Surfactant* | 0.5 |
| Water | 64 |

*The solubilizing agent employed in this example was sodium diethylhexyl sulphosuccinate and the nonionic surfactant was 2-4-7-9-tetramethyl-5-decyn-4, 7-diol; the ratio of agent to surfactant was 1:4 by weight.

When the above formulation was used in a trial, it was found that the usual benefits of flexography were present, i.e. greatly reduced paper waste, rapid drying with little ink rub-off, strike-through of the paper by oil is eliminated and excellent dot resolution was obtained. However, it was also found that the usual problems associated with water-based flexographic new inks were not present in respect to this formulation, i.e. this formulation exhibited improved color development, better lay and less fill-in than prior art flexographic new inks.

EXAMPLE 2

Two black publication gravure inks were formulated as follows:

| Component | Wt. %, Ink A | Wt. %, Ink B |
| --- | --- | --- |
| Black Pigment Base* | 30 | 30 |
| Clay Base** | 15 | 15 |
| Acrylic Emulsion Resin | 12 | 12 |
| Nonionic Surfactant*** | 2 | 2 |
| Solubilizing Agent**** | 1.5 | 0 |
| Water | 39.5 | 41 |

*The Black Pigment Base consisted of 30% Carbon Black in an acrylic resin solution vehicle
**The Clay Base consisted of 60% Clay in a Styrene-Maleic Anhydride Resin solution vehicle
***2-4-7-9-tetramethyl-5-decyn-4,7-diol
****Potassium Salt of a $C_{21}$ Dicarboxylic Acid When Inks A and B were trialed on a commercial press, the trap of black over red as well as the lay-down of Ink B was inferior to that of Ink A, illustrating the need for the solubilizing agent.

EXAMPLE 3

A blue water-based publication gravure ink was formulated as follows:

| Component | Wt. % |
| --- | --- |
| Blue Pigment Dispersion* | 20 |
| Clay Base from Example 2 | 25 |
| Acrylic Emulsion Resin | 18.5 |
| Antifoaming Agent | 0.5 |
| Water | 32 |
| Nonionic Surfactant** | 2 |
| Solubilizing Agent*** | 1 |
| Solubilizing Agent**** | 1 |

*50% Phthalocyanine Blue Pigment in acrylic solution vehicle
**2-4-7-9-tetramethyl-5-decyn-4,7-diol
***sodium diethylhexyl sulphosuccinate
****potassium salt of 8-[5 (6)-carboxy-4-hexyl-cyclohex-2-enyl]octanoic acid The blue water-based ink exhibited excellent printability when trialed on a publication gravure press; it was also noted that this ink readily transferred from the cells of the press.

EXAMPLE 4

A red publication gravure ink was formulated as follows:

| Component | Wt. % |
| --- | --- |
| Lithol Rubine Pigment Dispersion* | 30 |
| Acrylic Emulsion Resin | 14 |
| Clay Base from Example 2 | 10 |
| Urea | 4 |
| Dipropylene Glycol | 2 |
| EO/PO Copolymer Surfactant** | 2 |
| Water | 38 |

*40% Lithol Rubine Pigment in acrylic solution vehicle
**The copolymer had an ethylene oxide:propylene oxide ratio of 1:4 and a HLB of 7.

The ink was trialed on a commercial press running at 1300 feet per minute; the ink quality was comparable to that of conventional publication gravure inks.

We claim:
1. A water-based ink comprising:
 (a) water;
 (b) a pigment;
 (c) a nonionic surfactant having a solubility in water of less than about 0.5 wt. % and being present in an amount effective to lower the dynamic surface tension of the ink composition to a level in the range of about 25 to 40 dynes/cm; and
 (d) a solubilizing agent sufficient to solubilize substantially all of the nonionic surfactant, said solubilizing agent being selected from the group consisting of:

(1) the ammonium, potassium or sodium salt of 8(5-Carboxy-4-Hexyl-Cyclohex-2-enyl)Octanoic Acid:

(2) the ammonium, potassium or sodium salt of a $C_8$–$C_{13}$ dialkyl sulfosuccinic acid having a critical micellar concentration in the range of about 0.08 to 0.12:

(3) phosphate ester surfactants; and (4) mixtures thereof.

2. The ink composition of claim 1 having a dynamic surface tension of 25 to 30 dynes/cm.

3. The ink composition of claim 1 wherein the nonionic surfactant is present in an amount of about 1 to 4 wt. %.

4. The ink composition of claim 1 wherein the nonionic surfactant is selected from the group consisting of acetylenic diols containing 8 to 14 carbon atoms, acetylenic carbinols containing 8 to 14 carbon atoms and block copolymers of propylene oxide and ethylene oxide having an HLB Value in the range of about 3 to 8 and a propylene oxide to ethylene oxide ratio in the range of 8:1 to 3:1.

5. The ink composition of claim 1 wherein the solubilizing agent is present in an amount of about 0.1 to 5 wt. %.

6. The ink composition of claim 1 wherein the water is present in an amount of about 30 to 80 wt. %.

7. The ink composition of claim 1 wherein the pigment is present in amount of about 3 to 15 wt. %.

* * * * *